(12) United States Patent
Feinstein et al.

(10) Patent No.: US 9,239,719 B1
(45) Date of Patent: Jan. 19, 2016

(54) TASK MANAGEMENT SYSTEM

(71) Applicant: Amazon Technologies, Inc., Reno, NV (US)

(72) Inventors: Brian Jacob Feinstein, Mercer Island, WA (US); Viraj Vijay Sanghvi, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 167 days.

(21) Appl. No.: 13/747,556

(22) Filed: Jan. 23, 2013

(51) Int. Cl.
  *G06F 9/45* (2006.01)
  *G06F 9/44* (2006.01)
(52) U.S. Cl.
  CPC .................................... *G06F 8/70* (2013.01)
(58) Field of Classification Search
  USPC ........................................................ 717/102
  See application file for complete search history.

(56) References Cited

U.S. PATENT DOCUMENTS

| | | | |
|---|---|---|---|
| 6,938,240 B2 * | 8/2005 | Charisius et al. | 717/104 |
| 7,051,036 B2 * | 5/2006 | Rosnow et al. | 707/723 |
| 7,493,591 B2 * | 2/2009 | Charisius et al. | 717/100 |
| 2002/0078432 A1 * | 6/2002 | Charisius et al. | 717/102 |
| 2003/0106039 A1 * | 6/2003 | Rosnow et al. | 717/100 |
| 2005/0257136 A1 * | 11/2005 | Charisius et al. | 715/511 |
| 2012/0116835 A1 | 5/2012 | Pope et al. | |
| 2012/0144363 A1 * | 6/2012 | Bernardini et al. | 717/101 |
| 2014/0012616 A1 | 1/2014 | Moshenek | |
| 2014/0047414 A1 * | 2/2014 | Attar et al. | 717/121 |

OTHER PUBLICATIONS

Jurison, Software Project Management . . . , Sep. 1999, pp. 1-57.*

* cited by examiner

*Primary Examiner* — John Chavis
(74) *Attorney, Agent, or Firm* — Lindauer Law, PLLC

(57) ABSTRACT

Project-related tasks are managed and tracked using machine-readable codes. A project board may include one or more task tokens corresponding to tasks of a project, and each task token may include one or more machine-readable codes. Data associated with the project board may be acquired and analyzed to identify and decode the machine-readable codes. Task status information may be determined based on the positions of the task tokens on the project board. The task status information may be stored and used to generate a virtual project board that is accessible through a web site.

20 Claims, 9 Drawing Sheets

TASK MANAGEMENT SYSTEM

BACKGROUND

Organizations may employ various project management techniques to manage schedules, coordinate resources, define deliverables of product or service features, and ensure the quality and timeliness of the deliverables. For example, some software development organizations use "scrum" or "kanban" planning techniques for tracking tasks involved in developing and delivering software. Such techniques involve subdividing portions of a software product or service into tasks, and then tracking those tasks through phases of a software development workflow. Organizations may use a physical board, often referred to as a "scrum board" to facilitate project management.

Figure 1:
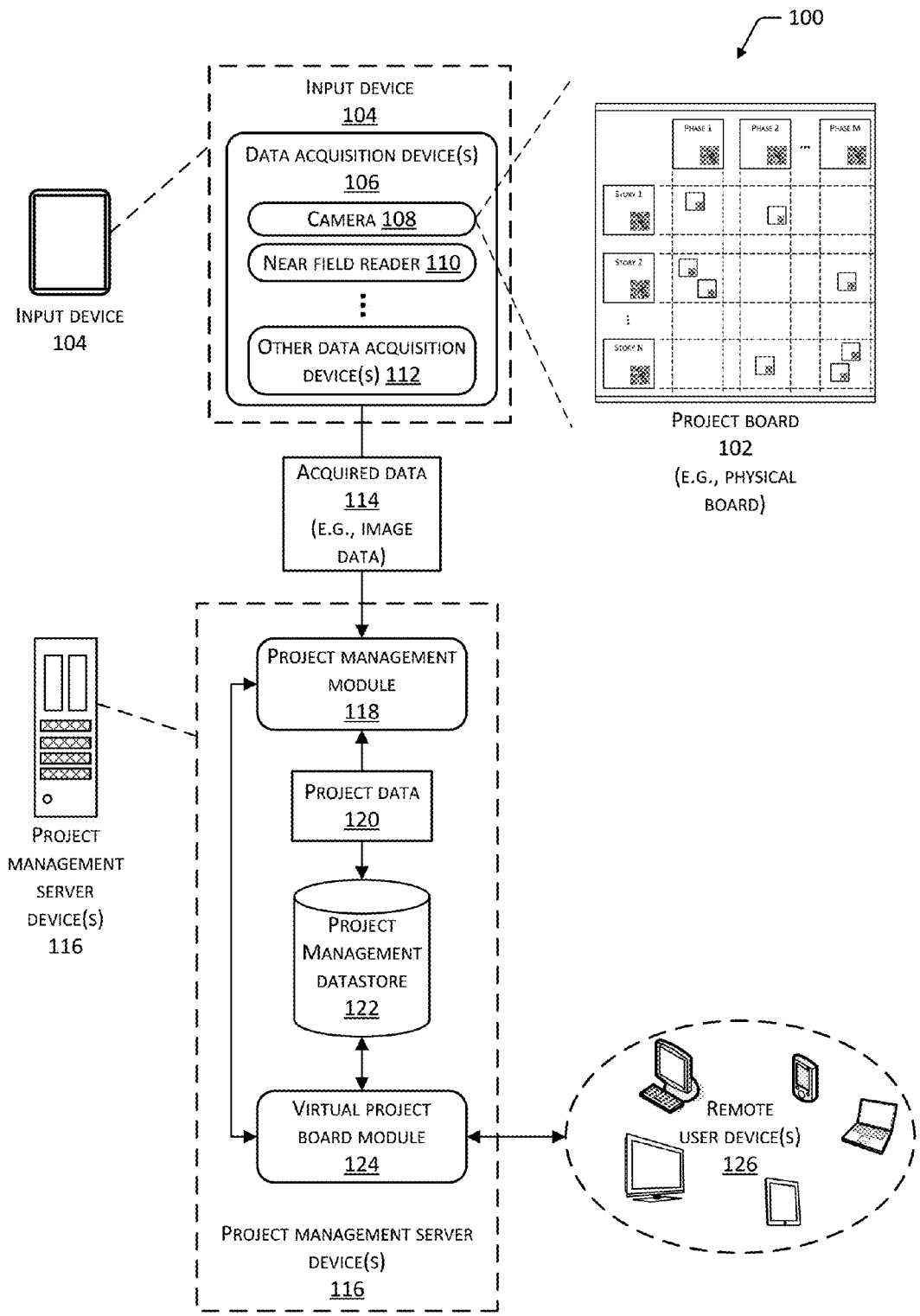
FIG. 1 depicts an environment for task management, including an input device to acquire information from a project board, and a project management server device to generate project data based on analyzing the acquired information.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes embodiments of systems, devices, methods, and computer-readable media for managing tasks using machine-readable codes. Implementations employ data acquired from a project board. As used herein, a project board may refer to a physical board, wall, structure, or object that includes information related to one or more tasks of a project. The project board may have any shape, size, or configuration. For example, the project board may be a wall, a white board, a chalkboard, an image projected onto a surface, and so forth. In some cases, the project board may be a scrum board used in a software development environment or other types of environments to track the status or progress of one or more tasks associated with a project. The project board may be physically located in proximity to team members working on a project, or may be located remotely.

On the project board, tasks may be indicated using task tokens. As used herein, a token may be a notation made on the project board, or an object affixed, in contact with, in proximity to, or otherwise included in the project board. The task token may comprise a repositionable piece of material such as paper or plastic configured to be affixed to the project board. The affixing may be provided using an adhesive, magnet, static cling, and so forth, which allows for addition, removal, or repositioning of the task token on the project board. A task token may include information describing a particular task associated with the project. For example, in cases where the project board tracks the status of a software development project, the project board may include task tokens for tracking tasks related to the design, development, testing, validation, documenting, or building of features in a software product or service. Task tokens may include information describing the task (e.g., write code for class X, write unit tests for class Y, write documentation for feature A, write login page for web site, and so forth). A project board may also include column and row tokens indicating columns and rows respectively, or other types of tokens to convey other types of information.

In implementations, each token may further include one or more machine-readable codes that encode information identifying or describing the token. In some implementations, the machine-readable code on a task token may encode an identifier that is associated with the task in a project management datastore, such that a scan of the machine-readable code enables information for the task to be retrieved from the project management datastore. In some cases, the identifier may be a unique identifier for the task. The machine-readable code on a token may also encode other information for the task, such as a description or title of the task, which team member is assigned to the task, and so forth.

As used herein, a machine-readable code may refer to any type of code that is readable by a computing device through the use of one or more input/output (I/O) devices. In some implementations, the machine-readable code may be readable through an optical scan. For example, optical machine-readable codes may include a barcode readable through the use of scanning software. Such a barcode may include a one-dimensional barcode such as a Universal Product Code (UPC). A barcode may also include a matrix barcode, multi-dimensional barcode such as a Quick Response (QR) Code, or other machine-readable representation of information in a visual format. An optical machine-readable code may also include an alphanumeric code that is readable through the use of optical character recognition (OCR) software. Other types of optical machine-readable codes may be employed, including but not limited to a color code, a pattern, or a shape that identifies a task. For example, the physical shape, size, orientation, or color of the token itself may be an optical machine-readable code that identifies a task.

Optical machine-readable codes may be optically readable in any portion of the electromagnetic spectrum, including the visible spectrum and portions of the electromagnetic spectrum outside the visible spectrum. For example, optical machine-readable codes may be imprinted on tokens using an ink that is readable in the infrared spectrum. In some implementations, the optical machine-readable codes may be readable or otherwise significant to humans. For example, the machine-readable code may comprise one or more letters, glyphs, patterns, designs, or icons.

In some implementations, the machine-readable codes may be machine-readable using non-optical means. In some cases, the machine-readable codes may include signal-based machine-readable codes, such as a near field communication (NFC) device that enables a device to read stored data through an electromagnetic signal. For example, the signal-based machine-readable code may be a radio-frequency identification (RFID) tag included in the token.

In some implementations, the machine-readable code may be machine-readable through a magnetic field. Such a magnetic machine-readable code may include an arrangement of magnetic ink or some other substance that is readable through use of a magnetic reader device or a magnetic field detector.

In some implementations, the machine-readable code may include an acoustic machine-readable code, such as an acoustic tag that is readable through the use of an acoustic telemetry device. The above examples of machine-readable codes are not exhaustive, and implementations may employ other types of machine-readable codes.

The position of each task token on the project board may indicate a status or progress of a task associated with the task token. The project board may be arranged into rows and columns. In some implementations, each column on the project board may correspond to a different phase for the tasks on the project board. For example, in cases where the project board tracks the progress of a software development project, the columns may correspond to project phases such as design, implementation, test, complete, shipped, deployed, and so forth. Members of the software development team may move a task token from one column to another to indicate progress of the task. For example, when a team member has completed implementation on a task, such that the task is ready for testing, the team member may move the task token for the task from the implementation column to the test column.

In some cases, a project may include one or more tasks that are grouped into task groups. For example, a software development project may include one or more features or use cases, often referred to as "stories," and each feature or use case may include one or more tasks to implement the feature or use case. In some implementations, each row on the project board may correspond to a different feature or use case, and the presence of a task token in a row may indicate that the task for that task token is associated with a particular feature or use case. Alternatively, each row may correspond to a different team member, and the presence of a task token in a row may indicate that the task for that task token is assigned to a particular team member.

The status of a task may be determined based on the position of its associated task token on the project board. For example, the presence of a task token in a particular column may indicate that the task associated with that task token has a status corresponding to the column (e.g., in design, in implementation, in test, or complete). The presence of a task token in a particular row may indicate that the task associated with that task token has a status corresponding to the feature, use case, or team member associated with that row. Accordingly, the status of a task may include one or more data elements such as the phase of development for the task, the feature or use case that includes the task, or the team member assigned to perform the task. In some cases, other information may be included in the status of a task, such as an estimated time of completion, time in progress, whether the task is on schedule, ahead of schedule, behind schedule, and so forth.

Although the implementations discussed herein describe a project board that is substantially rectangular, with rows and columns indicating task status, implementations are not so limited. Other implementations may employ a project board that is circular, irregularly shaped, or otherwise non-rectangular. Implementations may also employ a project board that does not use rows and columns to track task status, and that may employ a non-rectilinear coordinate system for determining a position of a token on the project board. For example, implementations may employ a circular project board in which a radial distance from the center of the board indicates a task status.

Moreover, although the examples included herein describe a project board (e.g., a scrum board) used to track the status of a software development project, implementations are not limited to a software development environment. Implementations may be employed in any type of environment in which objects, status, tasks, or personnel may be tracked, including but not limited to home or business inventory tracking, warehouse management, employment site personnel shift management, family chore management, and so forth. Moreover, implementations may also be employed in environments where a physical information source is to be synchronized with electronic data storage or with a virtual information source. For example, implementations may be employed to synchronize an electronic version to a corresponding physical version of a calendar, a notebook, a task list, a contact list, and so forth.

FIG. 1 depicts an example environment 100 for task management, including a project board 102. The project board 102 may be a physical project board such as that described above and further described with reference to FIG. 2. The environment 100 may also include one or more input device(s) 104 to capture, determine, or otherwise acquire data included in the project board 102. The input device 104 may include one or more data acquisition devices 106. The data acquisition device(s) 106 may employ data acquisition technology corresponding to the encoding method used on the machine-readable codes of the project board 102. For example, where the machine-readable codes include barcodes, matrix barcodes, alphanumeric text, and so forth, the data acquisition device(s) 106 may include one or more devices such as a camera 108 for capturing optical data in the visible, infrared, or other parts of the electromagnetic spectrum. Alternatively, where the machine-readable codes include NFC tags or devices, the data acquisition device(s) 106 may include a near field reader 110, a radio frequency receiver, or other types of devices for scanning and receiving electromagnetic signals. The data acquisition device(s) 106 may include other data acquisition device(s) 112 suitable to acquire data for the various types of machine-readable codes included in the project board 102.

The data acquisition device(s) 106 may read, scan, or otherwise acquire data included in the project board 102, to generate acquired data 114. In some implementations, the input device 104 may include functionality to support operation of the data acquisition device(s) 106, but may not include other functions. Accordingly, the input device 104 may include software or hardware components for the operation of the data acquisition device(s) 106, and components enabling the communication of the acquired data 114 to other computing devices. For example, the input device 104 may be a camera device such as a webcam, which includes the camera 108 to generate images of the project board 102. Such images may then be communicated to other devices, as the acquired data 114.

Alternatively, the input device 104 may be a computing device that includes the data acquisition device(s) 106 as well as other types of hardware and software components. For example, the input device 104 may be a mobile device such as a smartphone, a personal data assistant (PDA), a tablet computer, a wearable computer, a mobile gaming device, an electronic book reader, an optical code reader (e.g., a flying spot scanner or imaging-based scanner), and so forth. The input device 104 may also be a less mobile computing device such as a desktop computer, a personal computer, a laptop computer, a thin client, a terminal, a game console, a smart appliance, a home entertainment device, a mainframe computer, a network computer, and so forth. The input device 104 is described further below, with reference to FIG. 3.

In some implementations, the acquired data 114 may be sent to one or more project management server devices 116 for analysis. In some implementations, the acquired data 114 may be sent to the project management server device(s) 116 over one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), and mobile communications networks (e.g. 3G, 4G, and so forth). The networks may utilize communications protocols, including but not limited to packet-based or datagram-based protocols such as internet protocol (IP), transmission control protocol (TCP), and user datagram protocol (UDP).

In some implementations, the acquired data 114 may be sent from the input device 104 to the project management server device(s) 116 over a parallel or serial line. For example, the input device 104 may be connected to the project management server device(s) 116 using a universal serial bus (USB) cable compliant with the standards promulgated by the USB Implementers Forum, Inc. of Beaverton, Oreg. Alternatively, the input device 104 may send the acquired data 114 to the project management server device(s) 116 over a short-range wireless connection that employs the Bluetooth™ wireless technology standard managed by the Bluetooth Special Interest Group, or that employs another protocol.

The project management server device(s) 116 may include any type of computing device such as a desktop computer, a network computer, a rack-mounted server, a workstation, a laptop computer, a tablet computer, a mobile computing device, a virtual server, one or more cloud-based computing resources, and so forth. Further, the project management server device(s) 116 may include multiple computing devices that operate in a cluster or another grouped configuration to share resources, balance load, increase performance, provide fail-over support or redundancy, or for other purposes. The project management server device(s) 116 are described further below, with reference to FIG. 4.

In some implementations, the project management server device(s) 116 include a project management module 118 that performs operations for analyzing the acquired data 114, and generating project data 120 based on the acquired data 114. The project management module 118 may update a project management datastore 122 based on the project data 120. Operations of the project management module 118 are described further below with reference to FIGS. 6-9.

In some implementations, the project management datastore 122 stores data related to the one or more projects associated with the project board 102. This data may include a list of tasks associated with the project(s), and descriptions of those tasks. The data may also include descriptions of one or more features or use cases, and which tasks are associated with those features or use cases. The data may also include current or historical status information for each of the tasks, such as which phase the task is in, which team member is assigned to the task, and so forth. The data may also include a list of team members that may be assigned tasks, and a description of their various roles. For example, in the software development setting the project management datastore 122 may store information about team members who are developers, testers, program managers, project managers, and so forth. The project management datastore 122 may also store other types of data related to one or more projects.

In some implementations, the project management server device(s) 116 may also include a virtual project board module 124. The virtual project board module 124 may provide a user interface that includes a virtual project board, which is generated based on the project data 120 stored in the project management datastore 122. In some cases, the virtual project board substantially mirrors the information on the project board 102, enabling team members to view current project status information using one or more remote user device(s) 126. The remote user device(s) 126 may include any type of computing device such as those listed above with regard to the input device 104. In some implementations, the virtual project board module 124 may provide a user interface through a web site, and the remote user device(s) 126 may include a web browser or other application to access the user interface and view the virtual project board. An example user interface is described with reference to FIG. 5.

While working on a project, team members may add, delete, or move task tokens on the project board 102, and employ one or more input devices 104 to acquire the current task data from the project board 102. The acquired data 114 may then be sent to the project management server device(s) 116, and the project management module 118 may generate current project data 120 which is stored in the project management datastore 122. Such project data 120 may then be used to populate a virtual project board provided by the virtual project board module 124. Thus, implementations described herein enable team members to view project-related information that is on the project board 102, even if those team members are not physically located near the project board 102.

Some implementations also enable team members to add, delete, move, or edit task information through the virtual project board, and generate alerts to instruct a team member to update the task information on the project board 102 based on the changes made through the virtual project board.

Further, implementations also enable a project manager or other team member to produce reports based on the data stored in the project management datastore 122. Such reports may include statistics for current task status, tasks that are on schedule, tasks that are ahead of schedule, tasks that are behind schedule, time estimates for the completion of tasks, feature sets, or the project, information regarding team members that are over-utilized or under-utilized, and so forth. Reports may also be generated based on historical data, showing trends in time requirements for task completion, trends in productivity for team members, or other types of reports.

Although FIG. 1 depicts an environment 100 including one project board 102, implementations support the use of multiple project board(s) 102 located in a same location or different locations to facilitate project management. In such cases, one or more input device(s) 104 may acquire data from the multiple project board(s) 102, and send the acquired data 114 to the project management server device(s) 116 for analysis as described herein.

Figure 2:
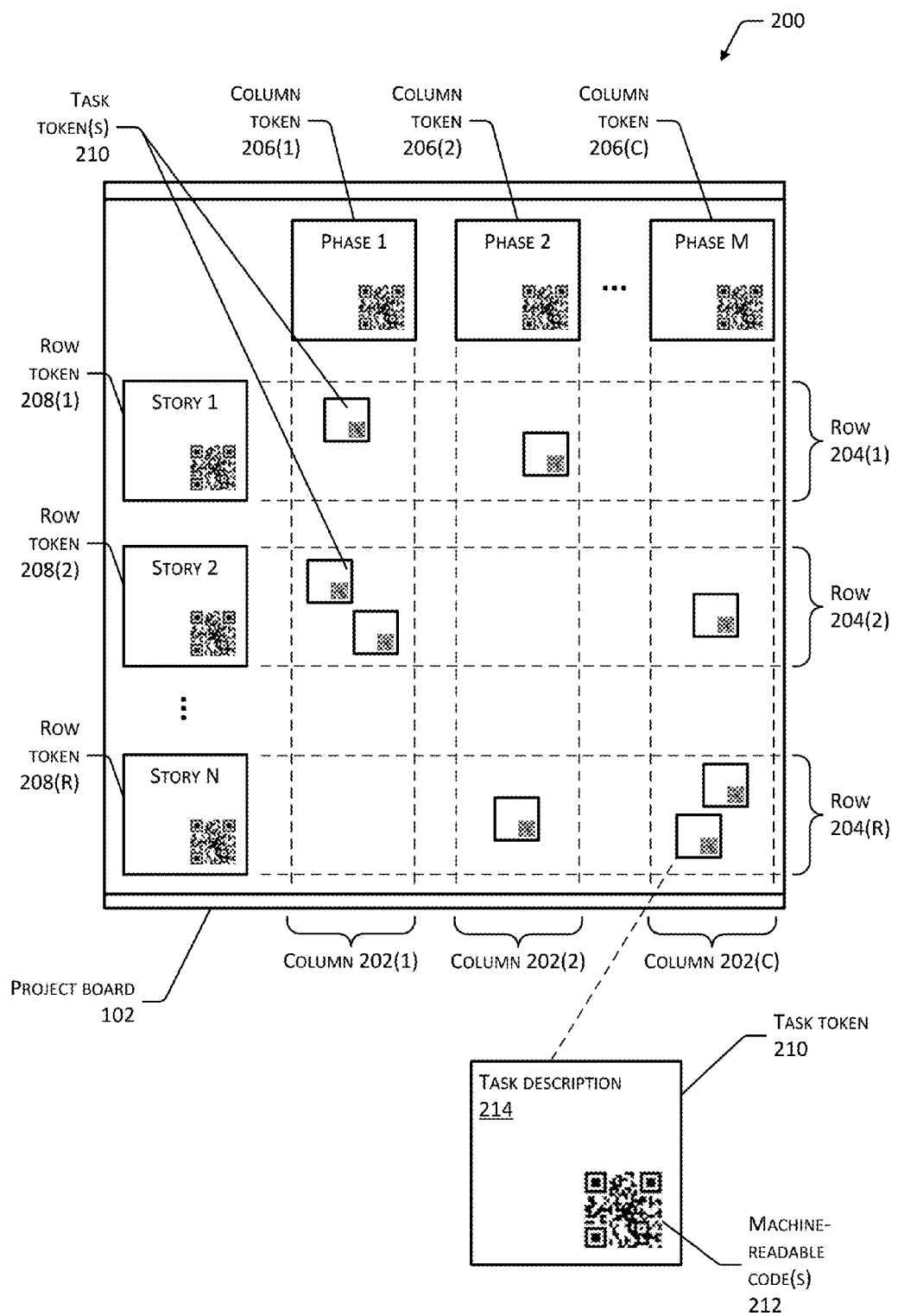
FIG. 2 depicts an example project board including one or more task tokens, wherein task information is included in the task token(s) using machine-readable codes.

FIG. 2 depicts a schematic 200, showing an example of the project board 102. In this example, the project board 102 may be a wall-mounted white board, a table-top board, or some other configuration. In some cases, the project board 102 may be a flat surface. Alternatively, the project board 102 may be at least partly curvilinear. Moreover, although FIG. 2 depicts an example of the project board 102 that is rectangular, implementations support any shape, size, orientation, or configuration of the project board 102.

In the example shown, the project board 102 includes one or more columns 202, and one or more rows 204. In some implementations, the columns 202 may be indicated through one or more column token(s) 206, and the rows 204 may be indicated through one or more row tokens 208. Each of the column token(s) 206 may include one or more machine-readable codes that encode information about the column 202 that is indicated by the column token 206. For example, in cases where the project board 102 tracks status for a software development project, the columns 202 may correspond to phases in the development process such as design, implementation, test, complete, and so forth. In such cases, a column token 206 may include one or more machine-readable codes that encode a description of the phase for the corresponding column 202. Alternatively, the column token 206 may include one or more machine-readable codes that encode an identifier that is related to a description of the phase in the project management datastore 122. Similarly, the rows 204 may correspond to features, use cases, or team members, and a row token 208 may include machine-readable code(s) that encode a description or an identifier of the feature, use case, or team member for the corresponding row 204. In some implementations, one or both of the column token(s) 206 or the row token(s) 208 may include multiple machine-readable codes to ensure accurate reading or scanning, for example in cases where the token is damaged or at least partly hidden by another object.

The project board 102 may include one or more task tokens 210, each corresponding to a task associated with the project. A position of the task token 210 on the project board 102 may indicate a status of the task identified by the task token 210. For example, the presence of a task token 210 in a particular column 202 may indicate that the task is in a particular phase (e.g., implementation, test, design, etc.) associated with the column 202. Further, the presence of a task token 210 in a particular row 204 may indicate that the task is part of a feature or use case associated with the row 204, or that the task is assigned to a team member associated with the row 204. Determination of the position of a task token 210 is further described with reference to FIG. 7.

Each task token 210 includes one or more machine-readable codes 212. In some implementations, the machine-readable code(s) 212 on a task token 210 encode a description of the associated task. Alternatively, the machine-readable code(s) 212 on a task token 210 encode an identifier that is related to a description of the task stored in the project management datastore 122. In such cases, the identifier encoded in the machine-readable code(s) 212 of the task token 210 may be used to retrieve data related to the task from the project management datastore 122. In some implementations, the task token 210 may include multiple machine-readable code(s) 212 to ensure accurate reading or scanning, for example in cases where the task token 210 is damaged or partially hidden by another object.

In some implementations, the task token 210 also includes a task description 214, which may be a human-readable description of the task associated with the task token 210.

In some implementations, one or more of the task token(s) 210, the row token(s) 208, or the column token(s) 206 may have one or more of a color, shape, or size that further indicates information about the corresponding task, row, or column. For example, a task token 210 may have a particular color, shape, or size which is associated with task information stored in the project management datastore 122. Moreover, although the project board 102 is described herein as a two-dimensional arrangement of tokens, implementations also support three-dimensional arrangements. For example, where the machine-readable code(s) 212 include magnetic or infrared markings that may be scanned through intervening surfaces or objects, the task tokens 210 may be at least partly stacked on top of each other on the project board 102. In such cases, the order of the stacking of the task token(s) 210 (e.g., the z-ordering) may carry information about the status of the corresponding task(s), or other information.

Figure 3:
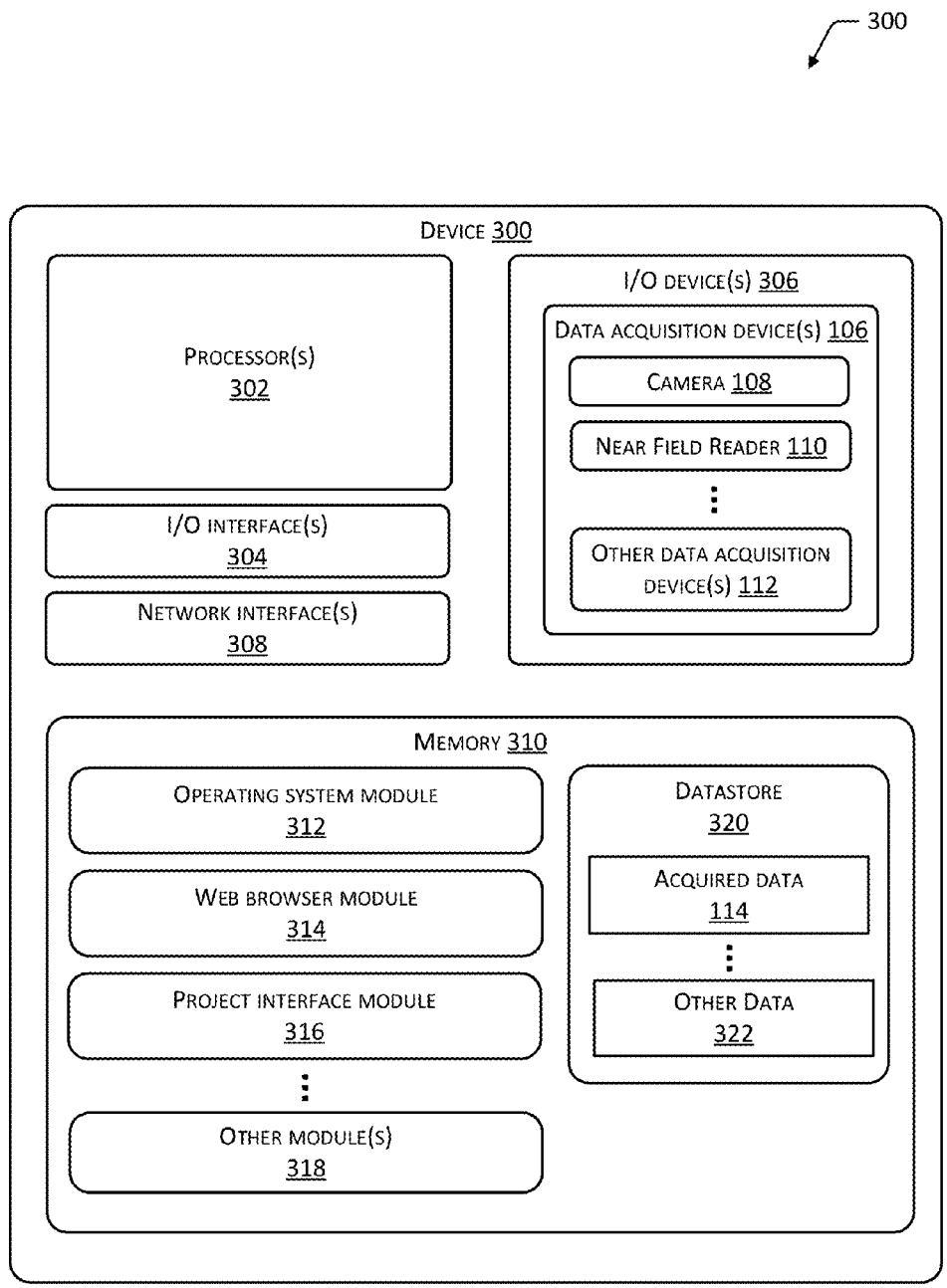
FIG. 3 depicts a block diagram of a device, such as an input device or a remote user device configured to perform operations for acquiring information from a project board or viewing project data through a virtual project board.

FIG. 3 depicts a block diagram of an example device 300 that may be employed in implementations. In some implementation, the device 300 may correspond to the input device 104 or the remote user device 126, and may be configured to perform operations for acquiring data from the project board 102 or viewing project-related information through a virtual project board provided by the virtual project board module 124. In some implementations, multiple components of the device 300 may be on a same die, as in a system-on-a-chip (SoC) or a field-programmable gate array (FPGA). The device 300 may include one or more processors 302 configured to execute one or more stored instructions. The processor(s) 302 may comprise one or more cores.

The device 300 may include one or more input/output (I/O) interfaces 304 to allow the device to communicate with other devices. The I/O interface(s) 304 may enable information to be transferred in or out of the device 300 through serial communication, parallel communication, or both serial and parallel. For example, the I/O interface(s) 304 may comply with the RS-232 standard for serial ports, or with the Institute of Electrical and Electronics Engineers (IEEE) 1284 standard for parallel ports. As another example, the I/O interface(s) 304 may be configured to provide a USB connection.

The I/O interface(s) 304 may couple to one or more I/O devices 306. The I/O device(s) 306 may include user input devices such as one or more of a keyboard, a mouse, a pen, a game controller, a voice input device, a touch input device, a gestural input device, a haptic input device, or other devices. The I/O device(s) 306 may also include output devices such as one or more of a display, a printer, audio speakers, haptic output devices, and so forth. The I/O device(s) 306 may also include one or more data acquisition device(s) 106 to acquire data from the project board 102. In some implementations, the data acquisition device(s) 106 include one or both of the camera 108 and the near field reader 110. The data acquisition device(s) 106 may also include one or more other data acquisition devices 112. In implementations, the I/O device(s) 306 may be physically incorporated with the device 300. Alternatively, the I/O device(s) 306 may be externally placed.

The device 300 may also include one or more network interfaces 308 to enable communications between the device 300 and other networked devices. Such network interface(s) 308 may include one or more network interface controllers (NICs) or other types of transceiver devices configured to send and receive communications over a network. The device 300 may also include one or more busses or other internal communications hardware or software that allow for the transfer of data between the various modules and components of the device 300.

As shown in FIG. 3, the device 300 includes one or more memories, described herein as memory 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the device 300.

The memory 310 may include at least one operating system (OS) module 312. The OS module 312 is configured to manage hardware resources such as the I/O interface(s) 304 and the I/O device(s) 306, and provide various services to applications or modules executing on the processor(s) 302. The OS module 312 may include one or more of the following: any version of the Linux® operating system originally released by Linus Torvalds; any version of iOS® from Apple Corp. of Cupertino, Calif.; any version of Windows® or Windows Mobile® from Microsoft Corp. of Redmond, Wash.; any version of Android® from Google, Corp. of Mountain View, Calif. and its derivatives from various sources; any version of Palm OS® from Palm Computing, Inc. of Sunnyvale, Calif. and its derivatives from various sources; any version of BlackBerry OS® from Research In Motion Ltd. of Waterloo, Ontario, Canada; or other operating systems such as VxWorks from Wind River Systems of Alameda, Calif.

In the example shown, the memory 310 includes a web browser module 314. The web browser module 314 may include a web browser application such as Mozilla® Firefox®, Microsoft® Internet Explorer®, Google® Chrome®, Apple® Safari®, Rockmelt®, or other web browsers. In some implementations, a user of the device 300 may employ the web browser module 314 to interact with a virtual project board provided by the virtual project board module 124. Alternatively, or in addition to the web browser module 314, the memory 310 may include a project interface module 316. In some implementations, the project interface module 316 may be a client-side application designed to interact with the virtual project board module 124, to enable a user to view the virtual project board. The memory 310 may also include other modules 318, such as a user authentication module, an access control module, and so forth.

In some implementations, the memory 310 also includes a datastore 320 to store information for operations of the device 300. The datastore 320 may comprise a database, array, structured list, tree, or other data structure. In some implementations, the datastore 320 may store the acquired data 114 that has been acquired from the project board 102 by the data acquisition device(s) 106. The datastore 320 may also store other data 322, such as user account information, user authentication information, and so forth.

Figure 4:
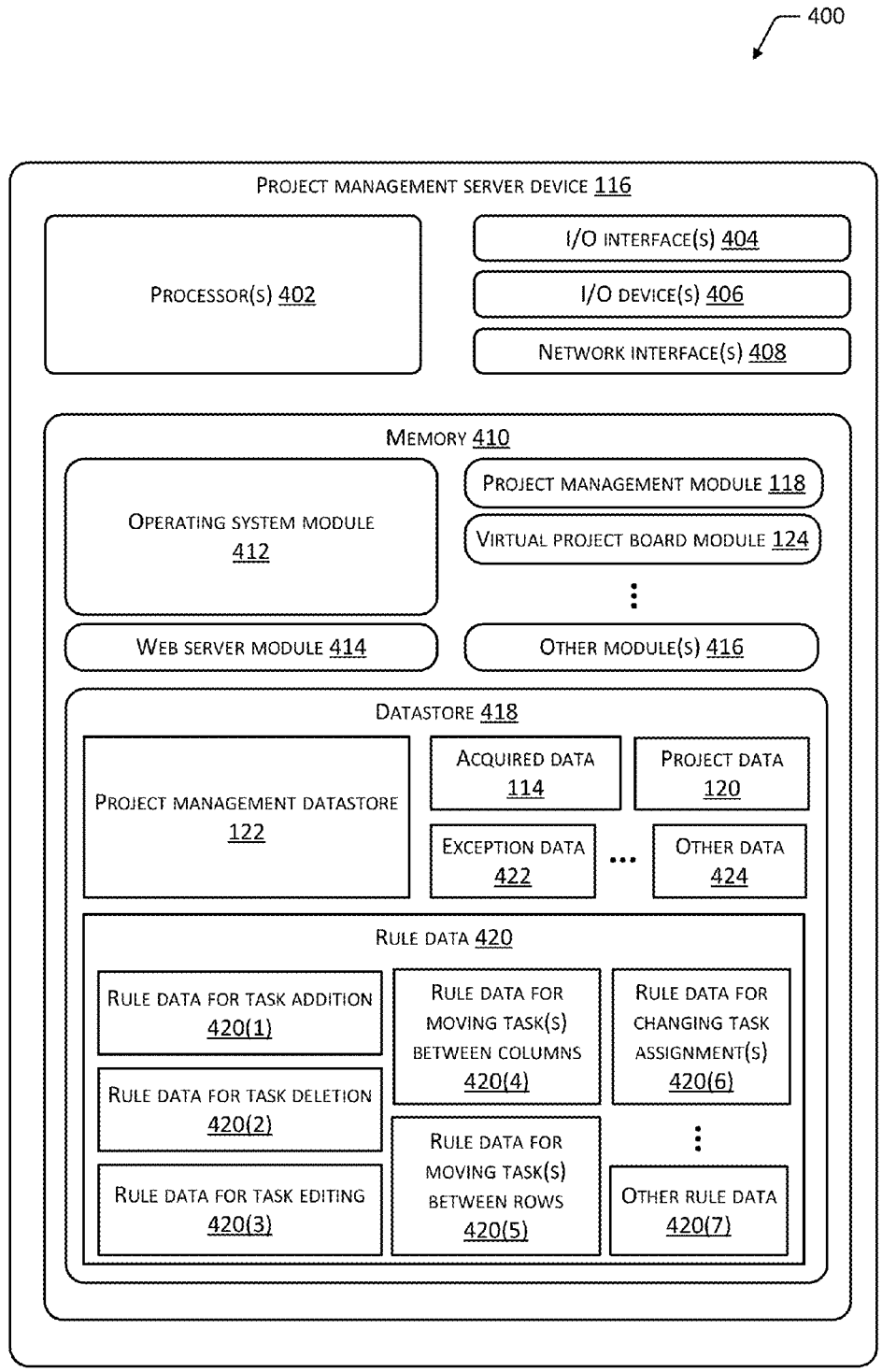
FIG. 4 depicts a block diagram of a project management server device, configured to perform operations for analyzing acquired information to generate project data, and for providing a virtual project board that includes the generated project data.

FIG. 4 depicts a block diagram 400 of the project management server device 116, configured to perform operations for analyzing the acquired data 114 to generate the project data 120, update the project management datastore 122, and provide a virtual project board that includes the generated project data 120. The project management server device 116 may include one or more processors 402 configured to execute one or more stored instructions. The processor(s) 402 may comprise one or more cores.

The project management server device 116 may include one or more input/output (I/O) interfaces 404 to allow the project management server device 116 to communicate with other devices, such as the input device(s) 104 or the remote user device(s) 126. The I/O interface(s) 404 may enable information to be transferred in or out of the project management server device 116 through serial communication, parallel communication, or both serial and parallel. For example, the I/O interface(s) 404 may comply with the RS-232 standard for serial ports, or with the IEEE 1284 standard for parallel ports. As another example, the I/O interface(s) 404 may be configured to provide a USB connection.

The I/O interface(s) 404 may couple to one or more I/O devices 406. The I/O device(s) 406 may include user input devices such as one or more of a keyboard, a mouse, a pen, a game controller, a voice input device, a touch input device, a gestural input device, a haptic input device, or other devices. The I/O device(s) 406 may also include output devices such as one or more of a display, a printer, audio speakers, haptic output devices, and so forth. In implementations, the I/O device(s) 406 may be physically incorporated with the project management server device 116, or may be externally placed.

The project management server device 116 may also include one or more network interfaces 408 to enable communications between the device and other networked devices. Such network interface(s) 408 may include one or more NICs or other types of transceiver devices configured to send and receive communications over a network. The project management server device 116 may also include one or more busses or other internal communications hardware or software that allow for the transfer of data between the various modules and components of the project management server device 116.

The project management server device 116 includes one or more memories, described herein as memory 410. The memory 410 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 410 provides storage of computer-readable instructions, data structures, program modules, and other data for the operation of the project management server device 116.

The memory 410 may include at least one operating system (OS) module 412. The OS module 412 is configured to manage hardware resources such as the I/O interface(s) 404 and the I/O device(s) 406, and provide various services to applications or modules executing on the processor(s) 402. The OS module 412 may include one or more of the following: any version of the Linux® operating system originally released by Linus Torvalds; any version of iOS® from Apple Corp. of Cupertino, Calif.; any version of Windows® or Windows Mobile® from Microsoft Corp. of Redmond, Wash.; any version of Android® from Google, Corp. of Mountain View, Calif. and its derivatives from various sources; any version of Palm OS® from Palm Computing, Inc. of Sunnyvale, Calif. and its derivatives from various sources; any version of BlackBerry OS® from Research In Motion Ltd. of Waterloo, Ontario, Canada; or other operating systems such as VxWorks from Wind River Systems of Alameda, Calif.

In some implementations, the memory 410 includes the project management module 118. The project management module 118 may receive the acquired data 114, analyze the acquired data 114 to generate the project data 120, and in some cases update the project management datastore 122 with the project data 120. Operations of the project management module 118 are described further herein with reference to FIGS. 6-9. The memory 410 may also include the virtual project board module 124, which provides a user interface and a virtual project board as described further with reference to FIG. 5. In some implementations, at least some of the functions of the project management module 118, the project management datastore 122, or the virtual project board module 124 may be performed by modules of the input device 104.

In the example shown, the memory 410 includes a web server module 414. The web server module 414 may host one or more web sites to deliver content over a network. Such content may be delivered using protocols such as any version of the hypertext transfer protocol (HTTP), the file transfer protocol (FTP), and so forth. The web server module 414 may also deliver active content written using a programming language such as JavaScript, Objective-C, and so forth. In some implementations, the web server module 414 may host a web site that includes a user interface and a virtual project board generated by the virtual project board module 124. In some implementations, functionality of the web server module 414 may be at least partly incorporated into the virtual project board module 124. The memory 410 may also include other modules 416, such as a user authentication module, an access control module, a source control module, an issue tracking module (e.g., bug tracking software), and so forth.

In some implementations, the memory 410 also includes a datastore 418 to store information for operations of the project management server device 116. The datastore 418 may comprise a database, array, structured list, tree, or other data structure. In some implementations, the datastore 418 may store the acquired data 114 that has been received from the input device(s) 104. The datastore 418 may also store the project data 120 that is generated based on an analysis of the acquired data 114. In some implementations, the datastore 418 includes the project management datastore 122. Alternatively, the project management datastore 122 may be located externally from the project management server device 116, for example in a separate datastore server or node.

In some implementations, the project management module 118 may apply one or more rules to determine whether to store the generated project data 120 in the project management datastore 122. Such rule information may be stored as rule data 420 in the datastore 418. Implementations support various types of the rule data 420, including rule data for task addition 420(1), rule data for task deletion 420(2), rule data for task editing 420(3), rule data for moving task(s) between columns 420(4), rule data for moving task(s) between rows 420(5), rule data for changing task assignment(s) 420(6), or other rule data 420(7). Each type of the rule data 420 may include one or more rules for particular changes to the project board 102. For example, rule data for task addition 420(1) may include one or more rules indicating under what circumstances a new task token 210 may be added to the project board 102.

If the project management module 118 determines that the project data 120 is not compliant with one or more rules included in the rule data 420, the project management module 118 may generate exception data 422. The exception data 422 may include alerts describing the non-compliant project data 120, and such alerts may be sent to a team member for resolution. For example, if a team member moves a particular task token 210 from the first column 202(1) directly to the last column 202(C), such an action may not comply with a rule included in the rule data for moving task(s) between columns 420(4). In such cases, an exception report may be generated as part of the exception data 422, stored in the datastore 418, and communicated to a team member for resolution. The application of the rule data 420 to the project data 120 is further described with reference to FIGS. 7 and 8.

The datastore 418 may also store other data 424, such as user account information, user authentication information, and so forth.

Figure 5:
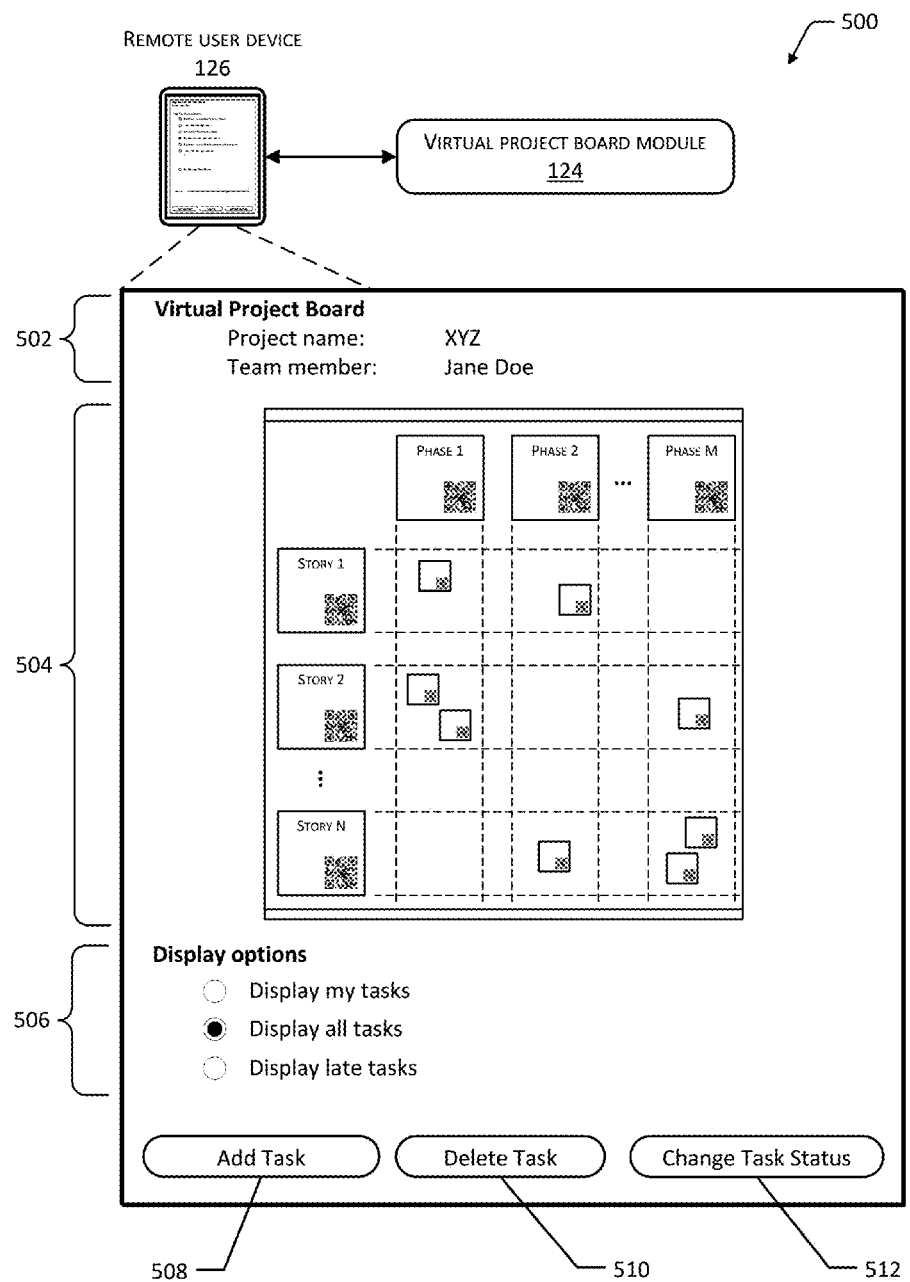
FIG. 5 depicts an example user interface to enable a user to view and update project data through a virtual project board.

FIG. 5 depicts an example user interface 500 to enable a user to view and update project information through a virtual project board. In some implementations, the user interface 500 and virtual project board may be provided by the virtual project board module 124, or some other module of the project management server device(s) 116, the input device(s) 104, or the remote user device(s) 126. A user may log in to or otherwise be authenticated to the virtual project board module 124, and access the user interface 500. In some cases, the user may access the user interface 500 from a remote user device 126.

In the example shown, the user interface 500 includes a section 502 that lists the project name (e.g., "XYZ"), and the team member currently accessing project information (e.g., "Jane Doe"). The user interface 500 may also include a section 504 that is a virtual project board. In some implementations, the virtual project board of section 504 may be generated based on project information stored in the project management datastore 122. Because the project management datastore 122 may be periodically updated with the acquired data 114 from the project board 102, the virtual project board may at least partly mirror the information displayed on the project board 102.

The user interface 500 may include a section 506 that lists various display options. In some cases, the user may employ such options to view all or a portion of the project information on the virtual project board. For example, a user may choose to "display my tasks" to show the tasks assigned to the user. The user may also choose to "display all tasks" to show all tasks, or "display late tasks" to show those tasks that are behind schedule. Implementations support any number of options for displaying project information in the virtual project board.

In some implementations, the user interface 500 may be a read-only interface, enabling users to view project-related data but not update the data or request changes. Alternatively, some implementations enable a user to request changes through the user interface 500. For example, in some implementations a user may move virtual task tokens on the virtual project board of section 504, to request changes in task status, task assignment, and so forth. The user interface may include any number of controls to enable a user to request changes. In the example shown, the user interface 500 includes a control 508 to enable a user to request that a task be added to the virtual project board. The user interface 500 also includes a control 510 to enable a user to request that a task be deleted from the virtual project board. The user interface 500 also includes a control 512 to enable a user to request a change in the status of a task on the virtual project board, or to otherwise request an edit of a task.

In some implementations, the changes requested by a user through the user interface 500 may be analyzed by the project management module 118 to determine whether the changes comply with the rules in the rule data 420, as described below. If the requested changes comply with the rule data 420, one or more notifications may be sent to team member(s) instructing the team member(s) to alter task information on the project board 102 in accordance with the changes requested through the virtual project board. If the changes do not comply with the rules in the rule data 420, the user may be shown an alert, warning, or error message through the user interface 500, indicating that the requested changes are non-compliant with one or more rules.

Moreover, implementations also enable a team member to create a new project through the virtual project board provided by the user interface 500. In such cases, a project manager or other team member may enter task data for the project into the virtual project board. The project management module 118 may receive the entered task data, determine its compliance with one or more rules as described below, store the data in the project management datastore 122, and create the physical task tokens 210 for placement on the project board 102. In implementations where the machine-readable code(s) 212 include scannable codes such as barcodes or matrix barcodes, the project management module 118 may print out task tokens 210 on paper including the machine-readable code(s) 212.

Although FIG. 5 shows an example user interface 500 with various user interface elements in particular positions, the particular example arrangement shown is not in any way limiting of implementations. Implementations may employ a user interface 500 that includes more or fewer user interface elements or controls or different types of user interface elements or controls, in any combination and in any arrangement to enable functionality of the implementations. Further, implementations may support multiple user interfaces (e.g., multi-page web sites) with functionality spread across various pages. Implementations may also support dynamically generated interfaces, where the particular user interface elements displayed and the location or duration of their display is based on a particular state of the system, particular characteristics of the user or the remote user device 126, or other factors.

Figure 6:
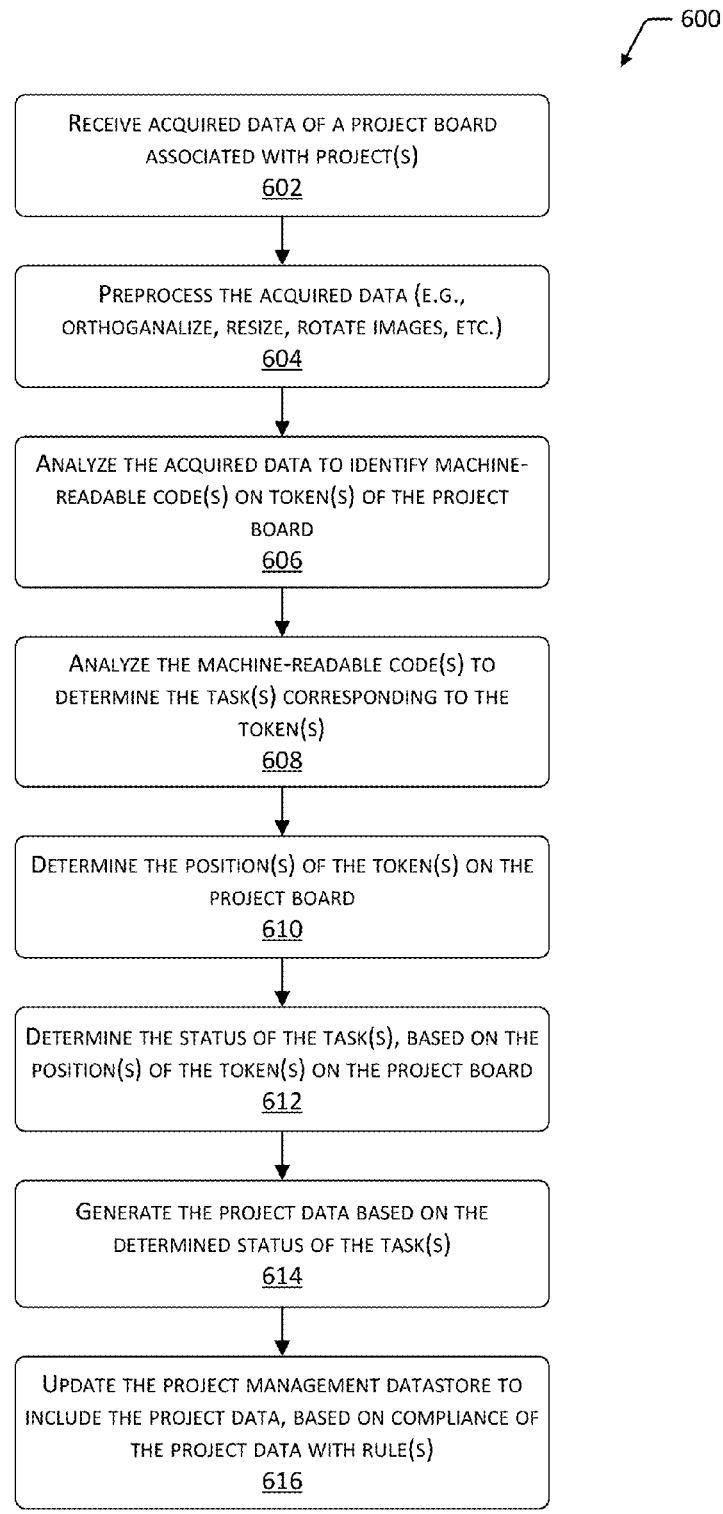
FIG. 6 depicts a flow diagram of a process for analyzing acquired data from a project board, and determining a status of one or more tasks of a project based on the analyzing.

FIG. 6 depicts a flow diagram 600 of a process for analyzing the acquired data 114 from the project board 102, and determining a status of one or more tasks of a project based on the analysis. The operations of this process may be performed by the project management module 118 or some other module of the project management server device(s) 116. In some implementations, at least some operations may be performed by one or both of the input device 104 and the remote user device(s) 126.

At 602, the acquired data 114 is received from one or more input device(s) 104. As described above, the acquired data 114 includes data from the project board 102 associated with one or more projects. In some implementations, the acquired data 114 includes one or more images or scans of the project board 102 created using the camera 108 or another imaging device. In some implementations, the acquired data 114 may include other types of data, such as magnetic field data generated by scanning the project board 102 with a magnetic reader device, or near field communication (NFC) data generated by the near field reader 110 as it receives data from one or more NFC tags included on task tokens 210 of the project board 102.

At 604, in some implementations the acquired data 114 may be preprocessed. For example, in cases where the acquired data 114 includes one or more images of the project board 102, such images may be orthogonalized, resized, rotated, or otherwise adjusted to show a substantially perpendicular or normalized view of the project board 102.

At 606, the acquired data 114 is analyzed to identify the one or more machine-readable code(s) 212 included on task token(s) 210 on the project board 102. In some implementations where the machine-readable code(s) 212 are optically readable codes such as barcodes, matrix barcodes, text, and so forth, the analysis may include the use of image processing methods to recognize the presence of the machine-readable code(s) 212 in the received image(s) of the acquired data 114. In some implementations, one or more complete machine-readable code(s) 212 may be identified at 606. Alternatively, implementations may identify at least a portion of the machine-readable code(s) 212, and that portion may be used to determine the task(s) corresponding to the task token(s) 210.

At 608, the identified machine-readable code(s) 212 are analyzed to determine the task(s) corresponding to the task token(s) 210 that include the machine-readable code(s) 212. In some implementations, this analysis includes decoding the machine-readable code(s) 212. For example, in cases where the machine-readable code(s) 212 are barcodes or matrix barcodes, barcode decoding software may be employed to extract the encoded information from the machine-readable code(s) 212. In some implementations, a description of the task itself may be encoded in the machine-readable code(s) 212. Alternatively, the machine-readable code(s) 212 may encode an identifier which may then be employed to retrieve task information from the project management datastore 122.

At 610, the acquired data 114 is further analyzed to determine a position of each of the task token(s) 210 on the project board 102. At 612, the status of one or more tasks is determined based on the position of each associated task token 210 on the project board 102. This determination of the position(s) of the task token(s) 210, and the determination of task status based on the position(s), is further described with reference to FIG. 7.

At 614, the project data 120 is generated based on the task status information determined at 612. In some implementations, the project data 120 includes a list of the tasks associated with task token(s) 210 on the project board 102, and a current status of each task as indicated by the position(s) of the task token(s) 210 on the project board. At 616, the generated project data 120 is analyzed to determine its compliance with one or more rules included in the rule data 420. This analysis is described further with reference to FIGS. 8 and 9.

Figure 7:
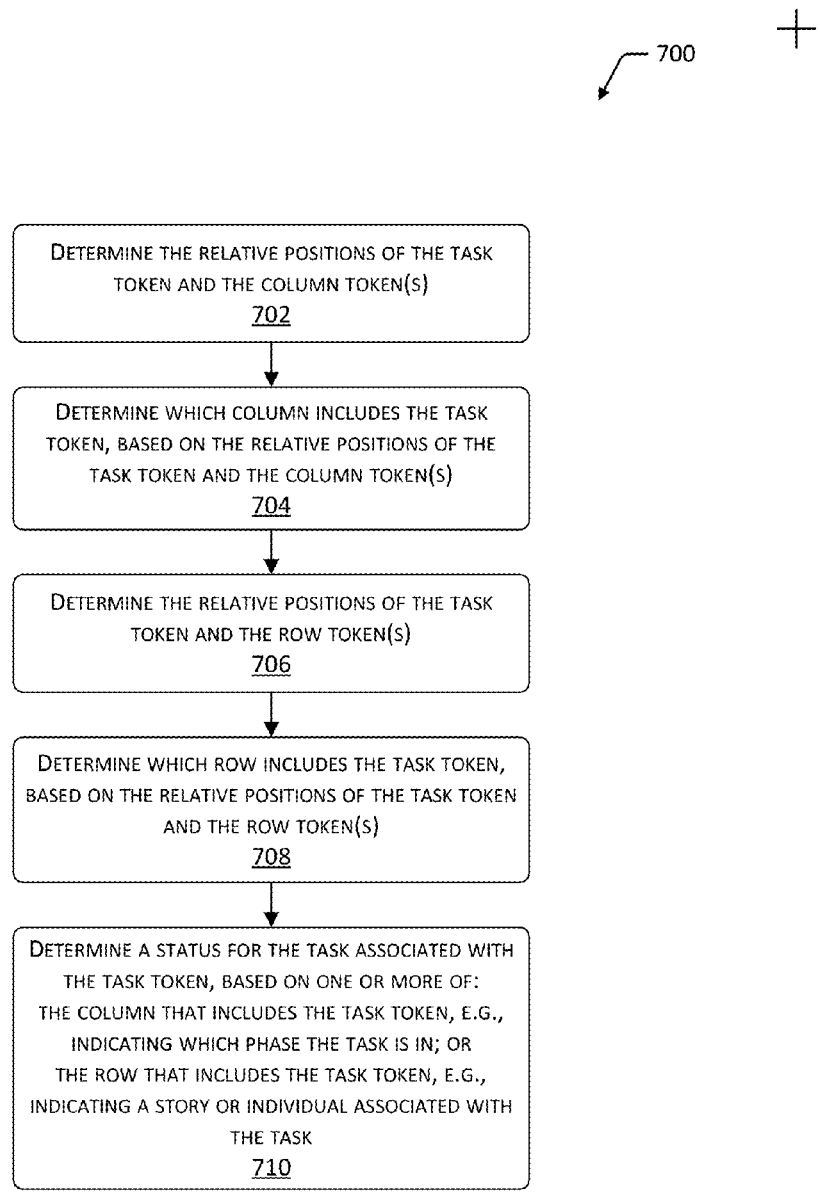
FIG. 7 depicts a flow diagram of a process for determining a position of a task token on the project board, and determining a status of a task associated with the task token based on the position.

FIG. 7 depicts a flow diagram 700 of a process for determining a position of a task token 210 on the project board 102, and determining a status of a task associated with the task token 210 based on its position. The operations of this process may be performed by the project management module 118 or some other module of the project management server device(s) 116. In some implementations, at least some operations may be performed by one or both of the input device 104 and the remote user device(s) 126.

At 702, for each task token 210 a position of the task token 210 is determined relative to the one or more column token(s) 206. In some implementations, this may include determining a distance between the task token 210 and each of the column token(s) 206. In some cases, this distance may be based on a distance between the machine-readable codes 212 on the task token 210 and on the column token 206, or a distance between an edge or a center of the task token 210 and the column token 206. In cases where the task token 210 or the column token(s) 206 include multiple machine-readable codes 212, the distance may be an average of the distances between the machine-readable codes 212.

At 704, for each task token 210 a determination is made of the column 202 that includes the task token 210. In some implementations, this may include determining which of the column tokens 206 is closest in distance to the task token 210.

At 706, for each task token 210 a position of the task token 210 is determined relative to the one or more row token(s) 208. In some implementations, this may include determining a distance between the task token 210 and each of the row token(s) 208. In some cases, this may be based on a distance between the machine-readable codes 212 on the task token 210 and on the row token 208, or on a distance between an edge or center of the task token 210 or the row token 208. In cases where the task token 210 or the row token(s) 208 include multiple machine-readable codes 212, the distance may be an average of the distances between the machine-readable codes 212.

At 708, for each task token 210 a determination is made of the row 204 that includes the task token 210. In some implementations, this may include determining which of the row tokens 208 is closest in distance to the task token 210.

Implementations support various methods for determining which row and which column includes a task token 210. In some cases, where the acquired data 114 includes an image of the project board 102, an edge-based image analysis of the image may be performed to find the edges of the column token(s) 206 and the row token(s) 208. Boundary lines may be extrapolated from the edges to define boundaries for rows and columns on the project board 102, and the edges of each task token 210 may be compared to the row and column boundaries to determine which row and column includes the task token 210. In some implementations, the project board 102 may include row and column boundaries, such as lines drawn on a white board. In such cases, the image(s) included in the acquired data 114 may be analyzed to identify the row and column boundaries, and row and column information for a task token 210 may be determined by comparing the edges of the task token 210 to the inscribed boundaries.

At 710, status information for the task associated with the task token 210 is determined based on the row and column that include the task token 210. In some implementations, the columns 202 of the project board 102 may each be associated with a phase in the project. For example, in cases where the project board 102 is associated with a software development project, the columns 202 may correspond to phases such as design, implementation, test, validation, complete, and so forth. In such cases, the presence of a task token 210 in a particular column 202 indicates that the associated task is in the phase corresponding to the column 202. Similarly, the presence of a task token 210 in a particular row 204 indicates that the associated task is part of the feature, use case, or story corresponding to the row 204, or is assigned to a particular team member corresponding to the row 204.

In some cases, determination of the particular row or column that includes a task token 210 may take into account errors in placement of the task token(s) 210 on the project board 102. For example, in cases where a task token 210 partly overlaps with a row or column boundary, the task token 210 may be determined to be within a row or column if a predetermined threshold percentage (e.g., 80%) of the task token 210 is within the row or column. In cases where a task token 210 overlaps with a row or column boundary beyond such a margin of error, exception data 422 may be generated to indicate that a team member is to adjust the placement of the task token 210 on the project board 102.

Moreover, in some cases the machine-readable code(s) 212 on a task token 210, row token 208, or column token 206 may be unreadable due to obstruction of the token, damage to the token, or for other reasons. In such cases, exception data 422 may be generated to alert a team member that the token is unreadable. Such exceptions may be communicated through the user interface 500, or through messages sent to one or more team members as e-mails, text messages, or other forms of communication.

Figure 8:
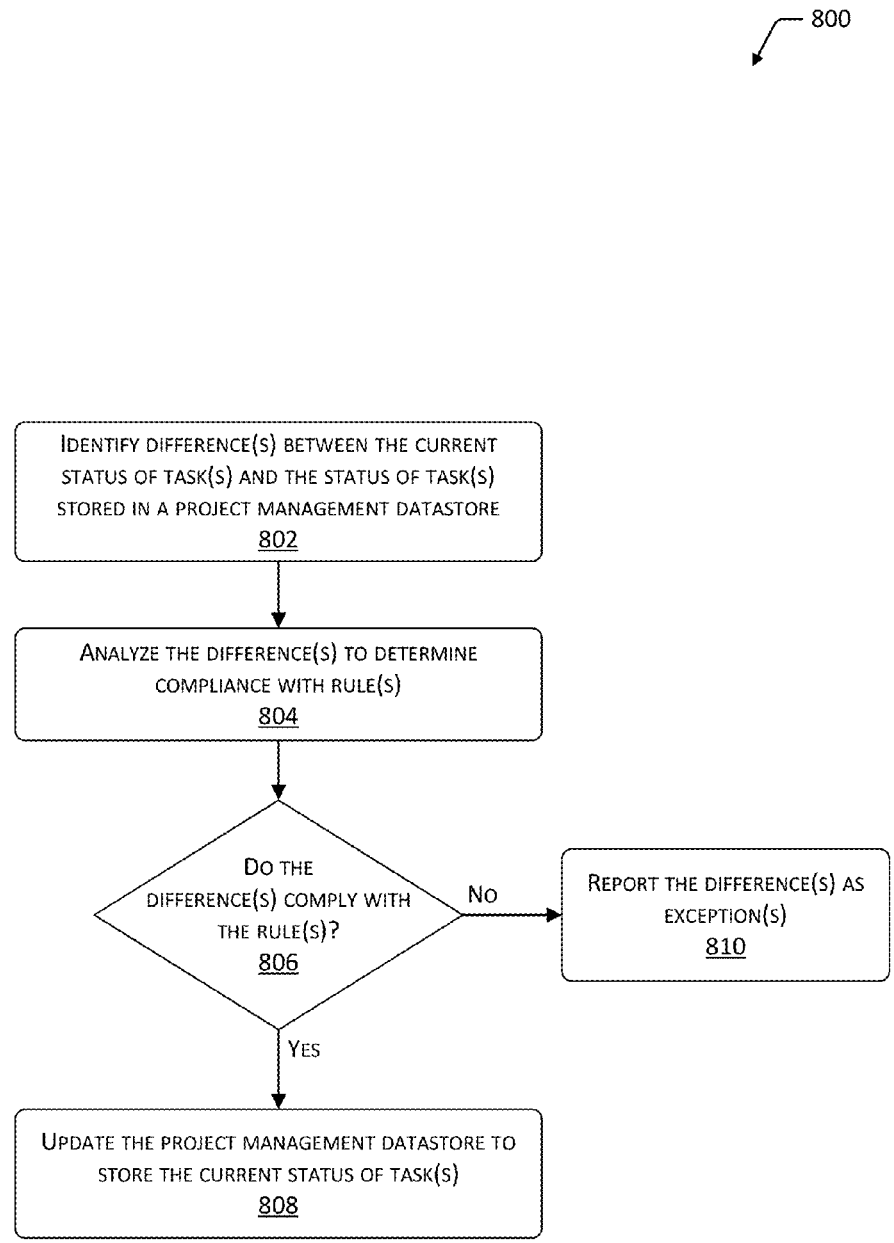
FIG. 8 depicts a flow diagram of a process for updating a project management datastore with project data, based on determination that the project data complies with one or more rules.

FIG. 8 depicts a flow diagram 800 of a process for updating the project management datastore 122 with the project data 120, based on determining whether the project data 120 complies with one or more rules included in the rule data 420. The operations of this process may be performed by the project management module 118 or some other module of the project management server device(s) 116. In some implementations, at least some operations may be performed by one or both of the input device 104 and the remote user device(s) 126.

At 802, the current task status information in the project data 120 may be compared to the task status information stored in the project management datastore 122. Such a comparison may identify tasks that have been added to the project board 102, removed from the project board 102, moved between columns 202 or rows 204 on the project board 102, or that have been otherwise altered or edited since the last update to the status information stored in the project management datastore 122. In some cases, the comparison of current status information to stored status information may employ one or more hashing operations to determine differences between the current status information and the stored status information.

At 804, if any such difference(s) are identified, the difference(s) may be analyzed to determine whether they comply with the rules in the rule data 420. Determination of rule compliance is described further with reference to FIG. 9.

At 806, if the difference(s) comply with the rules in the rule data 420, then at 808 the project management datastore 122 may be updated to store the current status of the tasks on the project board 102. If it is determined at 806 that at least one difference does not comply with a rule, then each non-compliant difference may be reported as an exception at 810. Such exceptions may be stored as exception data 422, and reported to one or more team members as an error, warning, or alert through the user interface 500. The exceptions may also be reported to one or more team members through e-mails, text messages, or through other forms of communication.

Figure 9:
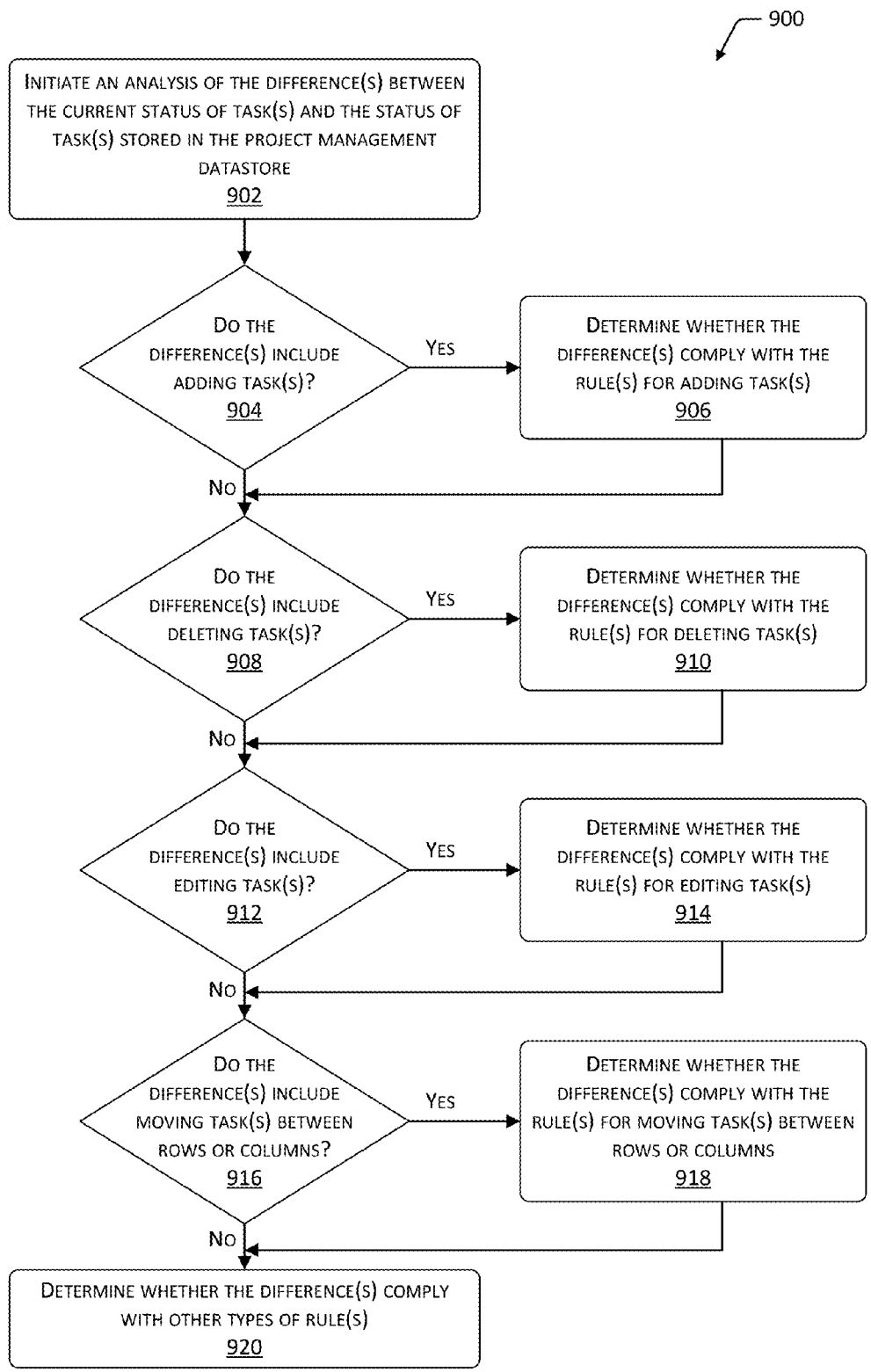
FIG. 9 depicts a flow diagram of a process for determining whether project data complies with various rule types.

FIG. 9 depicts a flow diagram 900 for a process for determining whether the project data 120 complies with various rules included in the rule data 420. The operations of this process may be performed by the project management module 118 or some other module of the project management server device(s) 116. In some implementations, at least some operations may be performed by one or both of the input device 104 and the remote user device(s) 126.

At 902, an analysis is initiated to analyze those differences between the current task status and the stored task status identified at 802. At 904, a determination is made whether the difference(s) include the addition of one or more new tasks to the project board 102. If so, then at 906 a determination is made whether the difference(s) comply with the rules included in the rule data for task addition 420(1). Any number of rules may be applied to determine whether a particular task may be added to a particular row or column on the project board 102, including but not limited to the following example rules.

A task may not be added if the total number of tasks on the project board 102 exceeds a predetermined maximum number.
 A task may not be added if the total number of tasks in a particular column 202 or a particular row 204 exceeds a predetermined maximum number.
 A task may not be added if the total number of tasks assigned to a particular team member exceeds a predetermined maximum number.
 A task may not be added if it is assigned to a team member who is no longer on the team.
 A task may be added if it is added in a particular column 202 (e.g., into the first column).
 A task may be added if it is added in a particular row 204.
 A task may not be added if it is substantially duplicative of another currently active task on the project board 102.

A task may not be added if the team member requesting the task addition lacks certain permissions to add tasks.

In cases where the rows 204 correspond to team members, a task may not be added to a row if the corresponding team member is inappropriate to perform the task. For example, a task to test a particular code module may be placed in a row corresponding to a team member who is a tester, but not in a row corresponding to a technical writer.

A task may not be added, in general.

Following 906, or if the determination at 904 is negative, at 908 a determination is made whether the difference(s) include the deletion of one or more tasks from the project board 102. If so, then at 910 a determination is made whether the difference(s) comply with the rules included in the rule data for task deletion 420(2). Any number of rules may be applied to determine whether a particular task may be deleted from the project board 102, including but not limited to the following example rules.

A task may not be deleted if the team member requesting the task deletion lacks certain permissions to delete tasks.

A task may not be deleted, in general.

A task may not be deleted if the total number of tasks on the project board, in a particular column 202, or in a particular row 204 falls below a minimum threshold number of tasks.

Following 910, or if the determination at 908 is negative, at 912 a determination is made whether the difference(s) include the editing of one or more tasks from the project board 102. If so, then at 914 a determination is made whether the difference(s) comply with the rules included in the rule data for task editing 420(3). Task editing may include editing the task description 214, an assignment of the task to a team member, an estimated time for completion of the task, or other types of edits. Any number of rules may be applied to determine whether a particular task may be edited, including but not limited to the following example rules.

A task may not be edited, in general.

A task may not be edited if the team member requesting the task edit lacks certain permissions to edit tasks.

A task may not be edited to change its assignment to a team member.

A task may not be edited to alter its estimated time for completion.

A task may not be edited to change its human-readable task description 214.

Following 914, or if the determination at 912 is negative, at 916 a determination is made whether the difference(s) include moving one or more tasks between columns 202 or rows 204 of the project board 102. If so, then at 918 a determination is made whether the difference(s) comply with the rules included in the rule data for moving tasks between columns 420(4), or the rule data for moving tasks between rows 420(5). Any number of rules may be applied to determine whether a particular task may be moved between columns 202 or rows 204, including but not limited to the following example rules.

A task may not be moved if the team member requesting the move lacks certain permissions to move tasks.

A task may be moved from column i to column i+1, but may not be otherwise moved between columns.

A task may not be moved after it has been moved to the right-most column (e.g., the "complete" column).

A task may not be moved from a first column to a second column if it has not spent a minimum threshold amount of time (e.g., one day) in the first column.

A task may not be moved to a row if the total number of tasks in that row would exceed a maximum number of tasks.

In cases where the rows 204 correspond to team members, a task may not be moved into a row if the corresponding team member is inappropriate to perform the task. For example, a task to write code to implement a particular code module may be moved into a row corresponding to a team member who is a developer, but not into a row corresponding to a technical writer.

A task may not be moved between rows, in general.

Following 918, or if the determination at 916 is negative, at 920 a determination is made whether the difference(s) comply with other types of rules included in the rule data 420.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Moreover, those having ordinary skill in the art will also recognize that certain structures or features illustrated in the figures above may be eliminated, combined, subdivided, or arranged in various configurations to implement the various techniques described above. Accordingly, the figures above should be viewed as examples and should not be viewed as limiting of implementations.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
   receiving an image of a physical project board associated with a project, the image comprising a physical token that includes a machine-readable code, wherein:
   the machine-readable code encodes an identifier indicative of a task associated with the project, and
   a relative position of the machine-readable code on the physical project board is indicative of a status of the task;
   analyzing the image to identify the machine-readable code;
   analyzing the machine-readable code to decode the identifier indicative of the task associated with the project; and
   determining a column on the physical project board occupied by the physical token;
   determining the status of the identified task based at least partly on the column occupied by the physical token on the physical project board.

2. The method of claim 1, wherein the at least one machine-readable code further includes at least one of an alphanumeric code, a color code, or a shape.

3. The method of claim 1, wherein:
the physical project board further comprises a plurality of columns, each of the plurality of columns corresponding to at least one phase associated with the project.

4. The method of claim 1, wherein:
the physical project board further comprises a plurality of rows, each of the plurality of rows corresponding to at least one person associated with the project; and
the determining the status of the identified task further includes:
- determining a position occupied by the physical token in one of the plurality of rows; and
- determining that the task is assigned to the at least one person corresponding to the one of the plurality of rows, based on the row occupied by the physical token in the one of the plurality of rows.

5. The method of claim 1, wherein:
the physical project board further comprises a plurality of rows, each of the plurality of rows corresponding to a task group of one or more tasks associated with the project; and
the determining the status of the identified task further includes:
- determining a row occupied by the physical token in one of the plurality of rows; and
- determining that the task is included in the task group corresponding to the one of the plurality of rows, based on the row occupied by the physical token in the one of the plurality of rows.

6. A system comprising:
at least one non-transitory memory storing computer-executable instructions; and
at least one processor configured to access the at least one memory and execute the computer-executable instructions to:
- receive data acquired from a physical project board, the physical project board associated with at least one project that includes a plurality of tasks, the physical project board including at least one machine-readable code that non-textually encodes an identifier indicative of at least one of the plurality of tasks;
- analyze the data to identify the at least one machine-readable code,
- analyze the at least one machine-readable code to decode the identifier indicative of the at least one of the plurality of tasks;
- determine a position of the at least one machine-readable code on the physical project board, and
- determine a status of the at least one task, based at least partly on the position of the at least one machine-readable code on the project board.

7. The system of claim 6, the instructions further configured to:
- identify at least one difference between the determined status and a saved status of the at least one task, wherein the saved status is stored in a project management datastore associated with the at least one project; and
- apply at least one rule to the at least one difference, wherein the at least one rule includes rule data for one or more of: a task addition, a task deletion, a task edit, a task movement between columns, or a task movement between rows.

8. The system of claim 7, the instructions further configured to:
update the project management datastore to store the determined status of the at least one task, based on a determination that the at least one difference satisfies the at least one rule.

9. The system of claim 7, the instructions further configured to:
report the at least one difference as at least one rule exception, based on a determination that the at least one difference does not satisfy the at least one rule.

10. The system of claim 6, wherein:
the physical project board further comprises:
- a plurality of columns, each of the plurality of columns indicated by a physical column token; and
- a plurality of rows, each of the plurality of rows indicated by a physical row token.

11. The system of claim 10, the instructions further configured to:
- determine at least one distance from the at least one machine-readable code to one or more of the physical column token or the physical row token; and
- determine the position of the at least one machine-readable code based on the at least one distance.

12. The system of claim 6, the instructions further configured to:
- update project data stored in a project management datastore, based on the status of the at least one task; and
- based at least partly on the project data, provide a user interface including a virtual representation of the physical project board.

13. The system of claim 6, wherein the at least one machine-readable code includes at least one of a barcode, a matrix barcode, a color code, a shape, a magnetic pattern, or a near field communication (NFC) tag.

14. One or more non-transitory computer-readable media storing instructions which, when executed by at least one processor, instruct the at least one processor to perform actions comprising:
- identifying at least one machine-readable code included in acquired data of a physical project board associated with at least one project, wherein the at least one machine-readable code encodes an identifier of at least one task of the at least one project;
- analyzing the code to decode the identifier of the at least one task;
- determining the at least one task associated with the at least one project based on the identifier as decoded from the code;
- analyzing the acquired data to determine a position of the code on the physical project board; and
- determining a status of the at least one task, based at least partly on the position of the code on the physical project board.

15. The one or more non-transitory computer-readable media of claim 14, wherein:
the physical project board comprises a plurality of columns and a plurality of rows; and
the determining the position of the at least one machine-readable code includes:
- identifying one of the plurality of rows that includes the at least one machine-readable code; and
- identifying one of the plurality of columns that includes the at least one machine-readable code.

16. The one or more non-transitory computer-readable media of claim 15, wherein:
each of the plurality of columns is associated with a phase of the at least one project; and the determining the status of the at least one task includes determining that the at least one task is in the phase that is associated with the one of the plurality of columns that includes the at least one machine-readable code.

17. The one or more non-transitory computer-readable media of claim 16, the actions further comprising:
   identifying at least one difference between the determined status and a saved status of the at least one task, the saved status being stored in a project management datastore associated with the at least one project;
   applying at least one rule to the at least one difference; and
   updating project data stored in the project management datastore to include the determined status of the at least one task, based on a determination that the at least one difference complies with the at least one rule.

18. The one or more non-transitory computer-readable media of claim 17, wherein the identifying the at least one difference between the determined status and the saved status of the at least one task further comprises performing at least one hash operation.

19. The one or more non-transitory computer-readable media of claim 17, the actions further comprising:
   providing a user interface including a virtual project board presenting data stored in the project management datastore.

20. The one or more non-transitory computer-readable media of claim 14, wherein:
   the acquired data includes at least one image of the physical project board; and
   the at least one machine-readable code includes one or more of a barcode, a matrix barcode, a color code, or a shape.

* * * * *